United States Patent [19]
Edwards et al.

[11] 3,858,026
[45] Dec. 31, 1974

[54] METHOD FOR INTERNALLY WELDING PIPE JOINTS

[75] Inventors: Coy W. Edwards, Holdenville, Okla.; Enos J. Laborde, Jr., Odessa, Tex.

[73] Assignee: CRC-Crose International, Inc., Houston, Tex.

[22] Filed: Sept. 7, 1973

[21] Appl. No.: 395,333

Related U.S. Application Data
[62] Division of Ser. No. 200,030, Nov. 18, 1971, Pat. No. 3,764,056.

[52] U.S. Cl................... 219/137, 29/484, 29/487, 219/61, 228/6
[51] Int. Cl.............................................. B23k 9/00
[58] Field of Search........ 29/484, 487, 407; 219/59, 219/60, 61, 137; 228/6, 44; 178/7.83

[56] References Cited
UNITED STATES PATENTS
| | | | |
|---|---|---|---|
| 900,381 | 10/1908 | Jottrand | 228/50 X |
| 2,465,354 | 3/1949 | Clark | 178/7.83 |
| 2,987,608 | 6/1961 | Handwerk et al. | 219/60 R |
| 3,009,049 | 11/1961 | Stanley | 219/60 R |
| 3,020,388 | 2/1962 | Elliott | 219/60 R |
| 3,424,887 | 1/1969 | Fehlman | 219/60 |

*Primary Examiner*—Robert D. Baldwin
*Assistant Examiner*—Robert J. Craig
*Attorney, Agent, or Firm*—Jack R. Springgate; Joe E. Edwards; M. H. Gay

[57] ABSTRACT

Method for internally welding pipe joints together by telescopingly moving a boom mounted welding head into the interior of the pipe, and into close proximity of the area to be welded. The pipe is rotated while the adjustably fixed welding head of the apparatus applies a bead of welding. The operation is remotely controlled while visual observation of the process is attained by means of a television camera mounted in proximity of the welding head. Provision is made for positioning the welding head relative to the pipe during the welding operation, as well as maintaining an unrestricted line of view between the camera and the area being welded.

6 Claims, 14 Drawing Figures

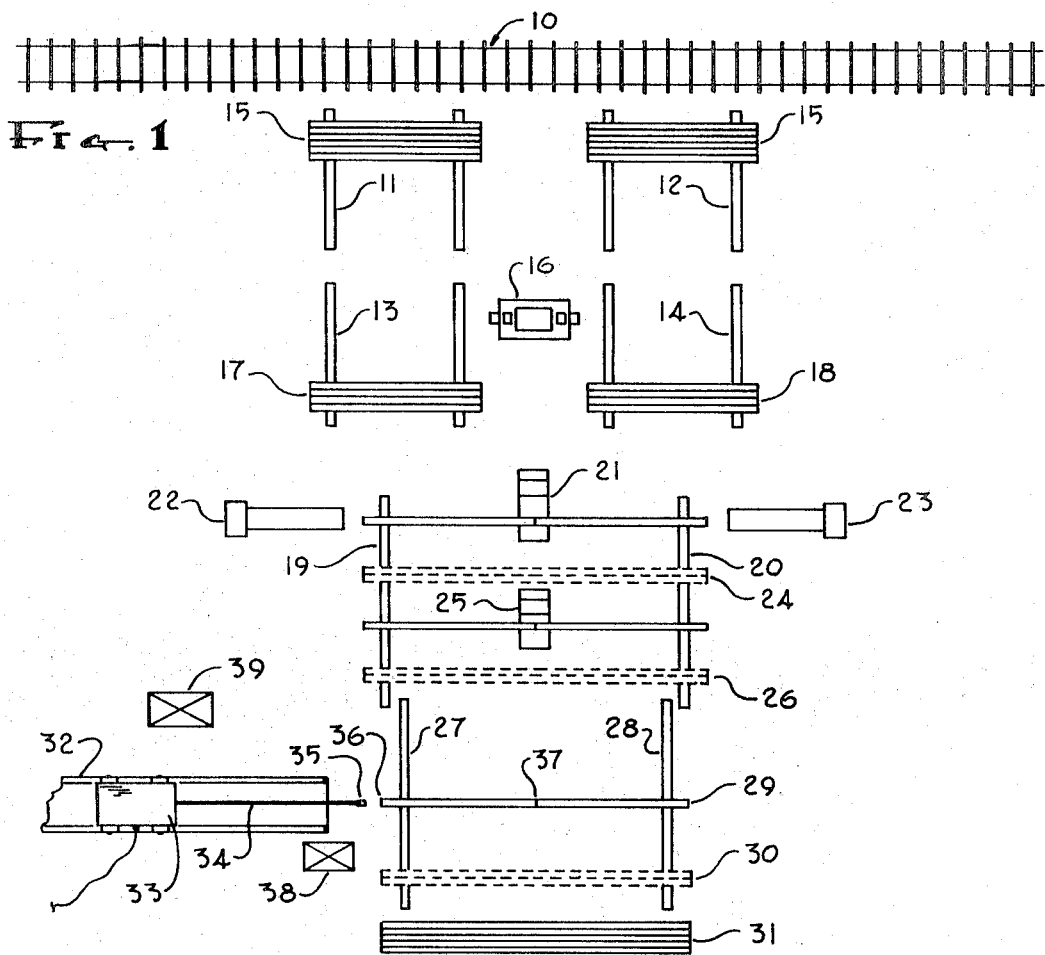

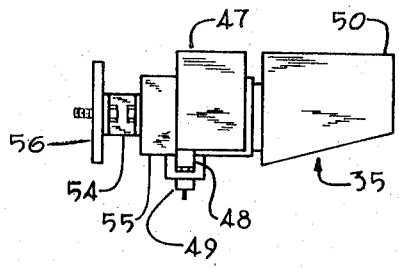
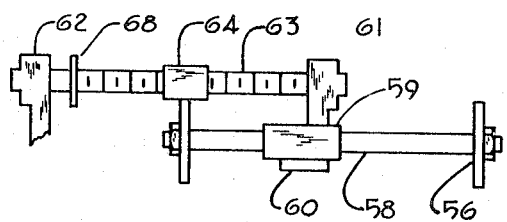
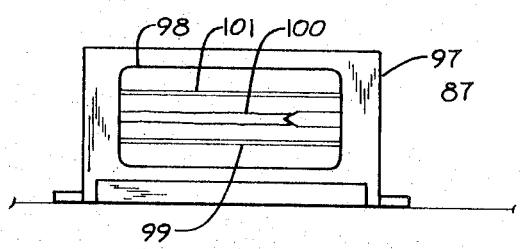
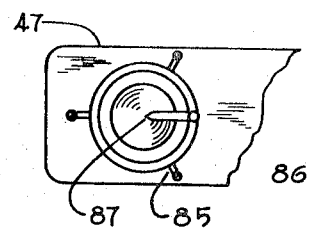
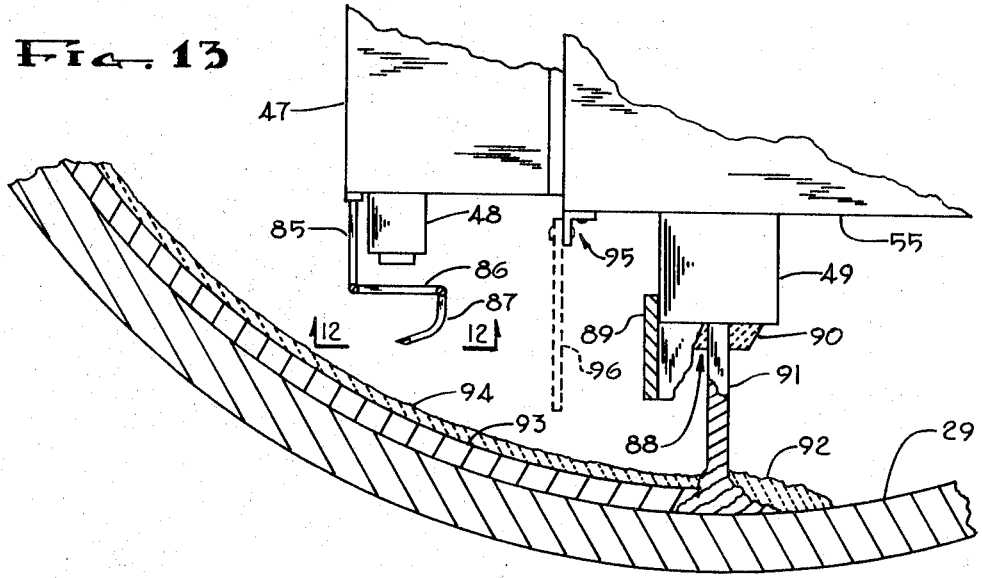

3,858,026

METHOD FOR INTERNALLY WELDING PIPE JOINTS

REFERENCE TO RELATED PATENT APPLICATIONS

U.S. Ser. No. 200,030, filed Nov. 18, 1971, now U.S. Pat. No. 3,764,056, of which the instant application is a division.

SUMMARY OF THE INVENTION

This invention comprehends a method for internally welding together pipe joints, and especially welding a bead utilizing the submerged arc process. The invention comprises adjustably mounting a welding head onto the free depending end of a boom and telescopingly moving the boom along with the welding head into the interior of the pipe and into close proximity of the interface formed between adjacent joints of pipe. Means for moving the head relative to the boom are provided so as to enable the bead to be laid down at the exact desired location on the pipe interior. Visual observation of the process is made possible by a television camera which is mounted to the head and focused on the weld as it is being formed. A television receiver is remotely positioned relative to the interior of the pipe, along with the necessary controls for carrying out the welding process, which enables an operator to visually monitor and control the formation of the weld.

Therefore, a primary object of this invention is the provision of a method by which the interior of a pipe can be welded while the welding operation is controlled from a location remote from the interior of the pipe.

Another object of the invention is to provide a method by which a remote controlled submerged arc process can be employed to effect a weld on the interior of a pipe.

A further object of this invention lies in the provision of a method of joining together joints of pipe by the submerged arc welding process wherein means are provided for viewing the process while the welding operation is controlled from a location remote from the interior of the pipe.

A still further object of this invention is to provide a method of welding the interior of a pipe by the employment of apparatus which is telescopingly received within the pipe, and the welding operation remotely controlled externally of the pipe.

Another and still further object of this invention is to provide a method for carrying out the submerged arc process on the interior surface of a pipe by remote control means.

An additional object of this invention is to provide a method for remotely controlling a submerged arc process which is carried out on the interior surface of a rotating pair of abutting pipe joints.

Another object is to provide a method which employs a remote control means by which a welding head can be controllably indexed relative to the interface formed between adjacent joints of pipe.

These and various other objects and advantages of the invention will become readily apparent to those skilled in the art upon reading the following detailed description and claims and by referring to the accompanying drawings.

The above objects are attained in accordance with the present invention by the provision of a method of internally welding pipe that is used with apparatus fabricated in a manner substantially as described in the above abstract and summary.

BRIEF DESCRIPTION OF THE EMBODIMENTS

FIG. 1 is a diagrammatical representation in the form of a flow sheet which sets forth a welding process which is carried out in accordance with the present invention;

FIG. 2 diagrammatically sets forth a side elevational view of one form of the appparatus for carrying out the present invention;

FIG. 3 is an enlarged fragmentary part diagrammatical, side elevational view of apparatus made in accordance with the present invention;

FIG. 4 is an end view of the apparatus disclosed in FIG. 3;

FIG. 5 is an enlarged cross-sectional view taken along line 5—5 of FIG. 2;

FIG. 8 is a side-elevational view of part of the apparatus disclosed in FIG. 6;

FIG. 9 is a fragmentary representation which sets forth part of the apparatus disclosed in FIG. 6;

FIG. 11 is a diagrammatical representation of part of the apparatus used in carrying out the present invention;

FIG. 12 is a fragmentary, bottom view of part of the apparatus disclosed in FIG. 10;

FIG. 13 is an enlarged, fragmentary, part cross-sectional representation of part of the apparatus disclosed in FIG. 6.

DETAILED DESCRIPTION OF THE PREFERRED EMBODIMENTS

Figure 7:
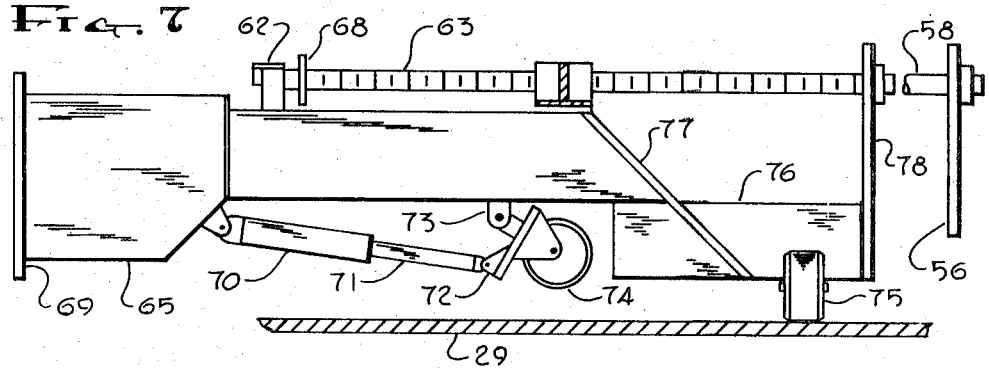
FIG. 7 is an enlarged part cross-sectional, side elevational view of the apparatus disclosed in FIG. 6.

Throughout the figures of the drawings, wherever possible, like or similar numerals will refer to like or similar elements.

In FIG. 1 a railroad track 10 lays adjacent to the spaced apart pipe racks 11 and 12, which in turn are positioned in close proximity to the spaced apart pipe racks 13 and 14. Joints of pipe 15 may be transferred from railroad cars (not shown) onto the pipe racks in a convenient and conventional manner. Station 16, the details of which are not essential to the invention and which can take on several different forms, receives pairs of lengths of pipe 15 adjacent thereto so that the adjacent ends thereof may be cleaned, ground to a bevel, and transferred into a position generally illustrated by the arrow at numerals 17 and 18.

Pipe racks 19 and 20 are spaced apart from a submerged arc welding apparatus 21, the details of which are known to those skilled in the art. The apparatus receives the joints of pipe with the aid of alignment apparatus 22 and 23 which pushes the joints of pipe into an axially aligned and abutting configuration. A bead of weld is applied about the rotating pipe at the abutting interface thereof to form a double jointed pipe. The double jointed pipe is positioned at 24, where the pipe then moves into proximity of the next submerged arc welding apparatus 25, whereupon an outermost bead of welding is applied to the innerface of the fixed rotating pipe.

The double jointed pipe is next positioned in a location as indicated by the numeral 26, where the pipe awaits the final welding operation which is comprised of effecting an internal weld about the inside peripheral surface of the rotating pipe at the interface thereof. Pipe racks 27 and 28 receive the double jointed pipe 29 from area 26, and after the pipe 29 has been provided with the inside string or bead of welding, the finished pipe is X-rayed at 30 and suitably stored at 31 for subsequent use. The entire process has therefore been used to advantage to completely weld together individual joints of pipe into a double jointed pipe, with the entire welding procedure being semi-automatically carried out by the submerged arc welding process.

The step of forming the before mentioned inside bead of welding is carried out by the provision of a track 32 upon which a cart 33 is movably mounted, with the cart being adapted to move along the track, carrying therewith an elongated cantilever boom 34. At the free end of the boom there is mounted a welding head 35, with the head and a marginal end portion of the cantilever boom being slidably received in a telescoping manner into end 36 of pipe 29, to thereby gain access to the interior of the pipe so as to enable a weld to be formed in the inside peripheral surface of the pipe at the interface 37 which connects together the double jointed pipe. Station 38 represents a convenient area for a workman to monitor and service the boom and welding head, while station 39 represents an area where the entire operation of the apparatus, including the boom mounted head, is remotely controlled and supervised.

In FIG. 2, in conjunction with FIGS. 3-5, the cantilever boom is seen to be supported by a hydraulically actuated roller assembly 140 which supports a midportion of the boom and at the same time controls the elevation of the boom and welding head relative to the pipe. The welding head is seen to be attached to a member 40 which provides means by which the head can be supported by and moved longitudinally and laterally of the interior surface of the pipe. Cylinder 41 retracts and extends a pair of journaled rubber tires 42 while the journaled rubber tires 43 are permanently mounted in fixed relationship relative to the head. Numeral 44 indicates circumferentially extending indicia, as for example chalk marks, placed on either side of the interface 37 so as to provide markers for a purpose which will be more fully discussed later on.

Nozzle 45 is controllably connected to a remote supply of high pressure air, and is spaced apart from illuminating means 46, with the illuminating means and the nozzle being directed towards and underlying the lense of camera 47. Electrode holder 48 is aligned with indexing means 49, while numeral 50 broadly indicates the various mechanism associated with the automatic submerged arc welding process. Numeral 135 generally indicates means which adjustably mount the head to the boom, so as to enable the head to be positioned longitudinally relative to the boom when exacting smaller relative motion thereof is required.

Figure 6:
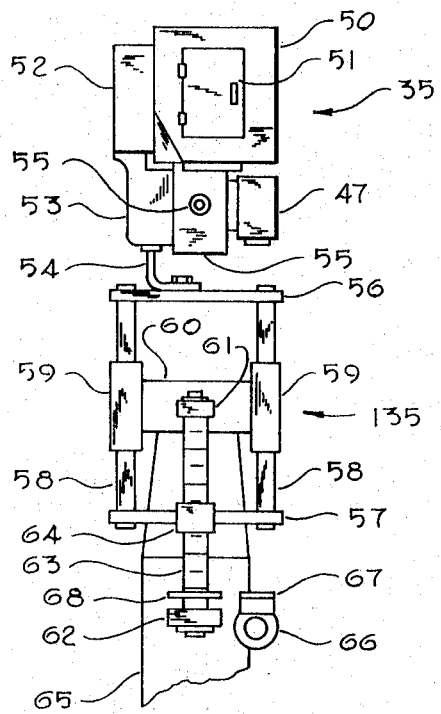
FIG. 6 is an enlarged, broken, top plan view of apparatus made in accordance with the present invention.

Looking now to the details of FIG. 6, in conjunction with some of the remaining figures, a flux hopper 50 is provided with a hopper door 51, and generally occupies the available space adjacent to motor 52 of a gear box case 53 of an automatic welding apparatus, as far example, a Lincoln welder, capable of delivering 700 amps. Angle bracket 54, which carries the entire weight of the head, is bolted to the before mentioned case while feed mechanism 55 is likewise bolted to the case. The welding rod is in the form of a wire which is fed through a ceramic insulator 55' in a manner known to those skilled in the art.

Spaced apart vertical plate members 56 and 57 are tied together by the illustrated spaced apart parallel polished rods 58, 58'. The rods are slidably received within fixed bushings 59, 59' with the bushings being welded to a horizontal plate member 60. The plate member 60 carries the entire load presented by the spaced apart plates 56, 57.

Spaced apart fixed journal means 61, 62 rotatably receive jack screw 63 therein, with a marginal length of the midportion of the jack screw threadedly receiving follower 64 thereon. The follower is rigidly affixed to the before mentioned plate 57 so that the plate must move therewith as the jack screw rotates.

Cantilever mount 65 supports horizontal plate 60 and motor 66, with the motor having a drive sprocket 67 engaged by a standard chain, and with the chain being meshed to a driven sprocket 68. The driven sprocket is affixed to a marginal end portion of the jack screw.

As seen in FIG. 7, the cantilever mount 65 is rigidly welded to a vertical plate 69 which in turn is bolted to and forms part of the free depending end of the boom.

Hydraulically actuated cylinder 70 has a piston reciprocatingly received therein, with the usual piston rod 71 having a depending end portion suitably journaled to plate member 72. Plate member 72 has the illustrated upwardly depending arm which is journaled to a pair of spaced apart webs 73, so as to enable the journaled rubber wheels 74 to be pivoted from a retracted into an extended position, and vise versa. Laterally positioned with respect to wheels 74 is another set of wheels 75, each of which are rotatably mounted to a yoke, with the yoke being rigidly affixed to frame member 76. Frame member 76 ties together the inclined plate member 77 and the vertically disposed plate member 78.

Figure 10:
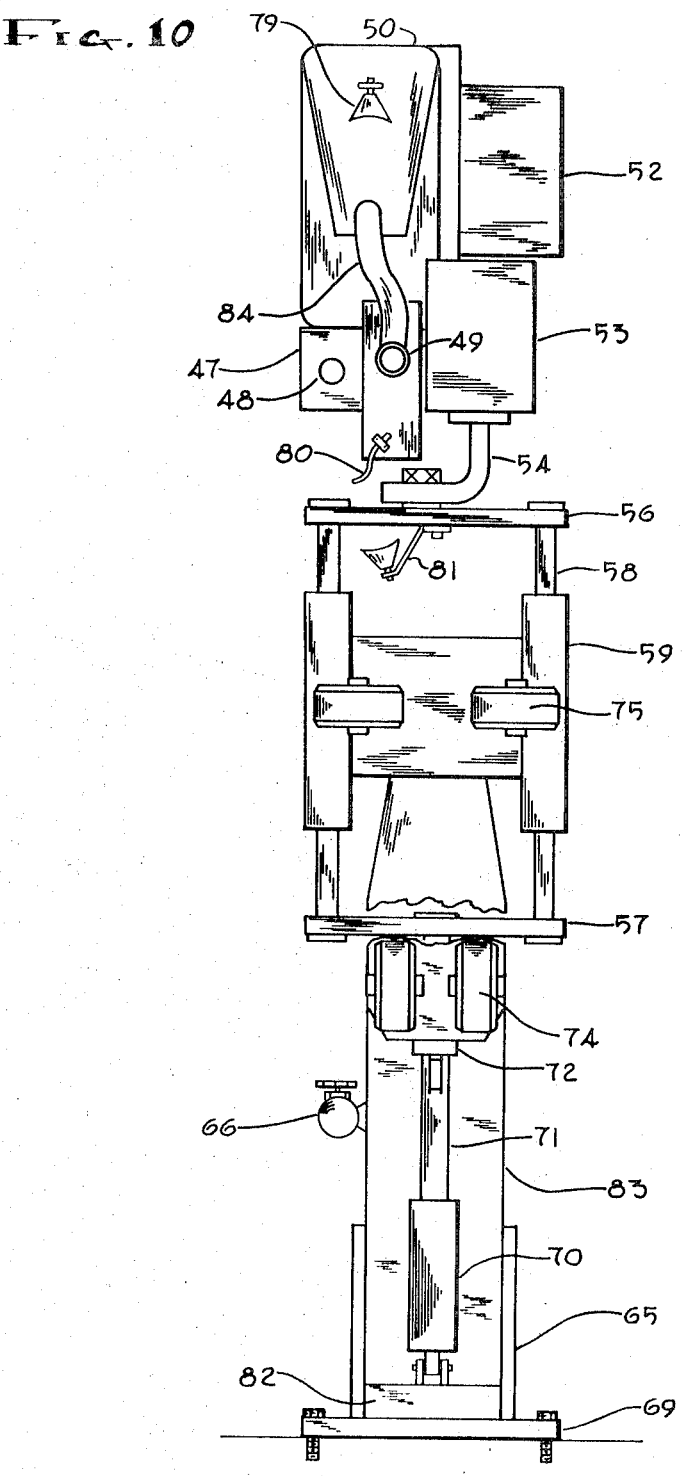
FIG. 10 is an enlarged bottom view of the apparatus disclosed in FIG. 6.

Looking now to the details of FIG. 10, in conjunction with the remaining figures, an incandescent light 79 provides illumination for the general area which is exposed to view of the camera lens. Air nozzle 80 is generally directed in a direction towards a rearward position relative to the bead which is being laid down or formed by electrode assembly 49. A second incandescent light 81 also is directed in the same general area as the light 79.

Web 82 is attached to the vertical plate 65 and to a portion of a cantilever type mount 83. It will be noted that the spaced apart plates 56, 57, and 69 are vertically disposed and arranged parallel to one another, and are of a size which permits entry into the interior of the pipe.

Looking now to the details of FIG. 13, in conjunction with some of the remaining figures, the camera 47 is seen to have a plurality of downwardly depending legs attached thereto, one of which is seen at 85, with the leg supporting a ring 86, and with the ring being axially aligned with the camera lens at 48. A free end portion of pointer 87 is seen depending from the ring. The pointer forms indexing means by which the electrode 90 can be aligned with a welding bead as the bead is being formed at the interface of the double jointed pipe.

Flux from the hopper is metered through the annular area 88 formed by cylindrical skirt member 89 and the welding rod 91. Ceramic insulator 90 has the illustrated welding rod fed therethrough, with the flux surrounding the rod and becoming molten as seen at 92. The bead 93 is covered with flux as indicated by the numeral 94 as is appreciated by those skilled in the art.

Bracket 95 supports a downwardly extending insulating curtain 96 to thereby shield the camera from the radiant energy produced by the arc welding process. Television receiver 97 is electrically connected to the camera 47 and includes a screen 98 having the illustrated image formed thereon during the welding process. The before mentioned spaced apart chalk lines are seen at 99, 101 while an image of the bead appears as indicated by numeral 100. An image of the pointer is seen at 87'.

In operation, the double jointed pipe 29 is positioned in the illustrated manner of FIG. 1, and the welding head is telescopingly placed within the pipe and run into close proximity of interface 37 by means of a motor driven trolley 33. The operator, seated at 39, for example, views screen 98 and as the welding head approaches the interface, an image of the chalk marks 44 appears upon the screen. Without the chalk marks, extreme difficulty would be experienced in locating the interface. As the arrow comes into close proximity of the interface, final small adjustments are made by utilizing the jack screw so as to attain exact alignment along the interface. The submerged arc welding apparatus is next remotely energized by the operator. As flux flows down annulus 88 and covers the moltent metal in the illustrated manner of FIG. 13, the operator, who is remotely positioned from the interior of the pipe, monitors the welding operation and continues to maintain arrow 87 aligned with image 100.

The relationship of rod 91 to the interface is remotely controlled by actuating motor 66 so as to cause the rotatable jack screw to move the follower longitudinally of the boom which in turn moves plate 56, thereby moving the entire welding head longitudinally of the pipe and boom in a manner which permits exact alignment of the rod and interface to be maintained. The jack screw is used for small or fine adjustments in the welding head while the trolley is used for much larger, or course movement of the head. Since arrow 87 is arranged in spaced apart relationship relative to electrode 91 and to the travel of the inside peripheral surface of the pipe, the bead is exactly superimposed upon the interface so long as image 87 is maintained superimposed over image 100.

Should debris such as flux fall between the camera lens and the bead, the operator actuates a remote controlled solenoid valve so as to cause air from the nozzle to blow the debris downstream of the weld.

Figure 14:
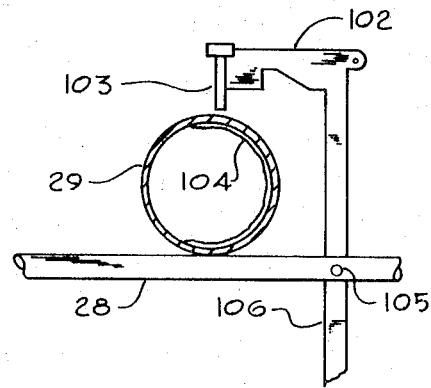
FIG. 14 is a part cross-sectional view which discloses an important feature of the present invention.

It is necessary to remove the initial flux 104 from the bead and to overlap the beginning and end of the circumferentially extending bead approximately one-half inch so as to provide an acceptable weld. For this reason it is necessary to remove the flux 104, which, as it cools, will usually tend to curve away from the pipe wall as illustrated in FIG. 14. It is necessary, however, to occasionally impact or "jar" the interface of the double jointed pipe so as to facilitate this removal, and, for this purpose, structure 102 has affixed thereto an impact hammer 103 which impacts against the outer peripheral wall surface of the pipe 29 to thereby jar the flux loose. Journal means 105 enables arm 106 to pivot the mechanism free of the direction of travel of the pipe so that the pipe can be rolled into position 30 after the weld is completed. Accordingly, the apparatus of FIG. 14 provides means for impacting the area of the pipe where the bead has been formed to thereby loosen the flux from the bead.

The welding leads, power source, air source, camera hook-up wires, and welding wire are all brought from the head, along the boom, and to the trolley, where they continue on to their proper destination. The details of this aspect of the invention can take on a number of different forms and is considered to be within the comprehension of those skilled in the art.

I claim:

1. Method of internally welding pipe joints together, comprising:
    1. placing two joints of pipe into abutting relationship to form an interface therebetween;
    2. placing circumferentially extending indicia adjacent and parallel to said interface on the interior of the pipe joint;
    3. adjustably mounting a welding head onto one end of a boom in a manner to enable the head to be moved relative to the boom and pipe joints;
    4. telescopingly moving said end of the boom along with the welding head into the interior of the pipe and into close proximity of said interface;
    5. aligning the welding head with the interface by moving the head relative to the boom;
    6. controlling the action of the welding head and the boom from a location remote from the pipe interior;
    7. mounting a television camera adjacent to the welding head and a television receiver at the location remote from the pipe interior, so as to enable the camera to televise an internal view of the pipe to the receiver;
    8. placing a pointer means in front of the camera in aligned relationship respective to the welding head;
    9. visually observing the area in close proximity to the welding head from a location remote from the interior of the pipe, so as to enable remote control of the position of the pointer means relative to the indicia as a welding bead is formed interiorly of the pipe and along said interface.

2. The method of claim 1, and further including the step of:
    10. contacting the side wall of the pipe with an impact device so as to loosen the flux from the weld.

3. The method of claim 1, and further including the step of:
    10. flowing air towards the viewed area so as to maintain a clear viewing area.

4. Method for effecting an internally welded interconnection between abutting pipe joints comprising:
    1. rotating the abutting pipe joints about the longitudinal axis thereof;
    2. mounting a television camera and a welding head onto one end of a boom with the camera viewing a portion of the interface which trails behind the welding head; and, supporting the remaining end of the boom in a manner to effect axial movement of said one end of the boom relative to the pipe joints;
3. telescopingly moving said one end of the boom into the interior of the pipe and into close proximity of the interface formed between the abutting pipe joints;
4. aligning said welding head with said interface by remotely moving said welding head relative to the boom;
5. positioning an index means which visually indicates the relative position of the welding head and the welding bead being formed on the interior of the pipe;
6. visually observing an area in close proximity to the interface from a location remote from the interior of the pipe joints by connecting said television camera to a television receiver to thereby enable the action and position of the welding head to be controlled as a welding bead is formed along the interface by the welding head.

5. The method of claim 4 and further including the step of:
7. contacting the side wall of the pipe with an impact device with sufficient force to loosen the flux from the weld.

6. The method of claim 4 and further including the step of:
7. flowing air towards the viewed area at a flow rate which maintains a clear viewing area of the vicinity being welded.

* * * * *